3,062,840
EPOXY-SUBSTITUTED POLYHYDRIC PHENOLS
Carl G. Schwarzer, Walnut Creek, and Paul H. Williams, Orinda, Calif., assignors to Shell Oil Company, a corporation of Delaware
No Drawing. Filed Sept. 18, 1959, Ser. No. 840,803
13 Claims. (Cl. 260—348)

This invention relates to a new class of epoxy phenols and to their preparation. More particularly, the invention relates to new epoxy-substituted bisphenols prepared from epoxy-substituted carbonylic compounds and to their preparation from epoxyalkyl aldehydes and ketones.

Epoxy resins known heretofore have been largely polyglycidyl ethers of a dihydric phenol, such as Bisphenol-A, i.e., 2,2-bis(4-hydroxyphenyl)propane. Although the cured products of these epoxy resins are hard and strong at normal atmospheric temperatures, the hardness and strength of the products are much less at elevated temperatures. Consequently, the usual epoxy resins are not very suitable in applications where the cured product is subjected to conditions of elevated temperatures. In addition, the water resistance of the cured products is not as good as desired for many applications.

It is an object of this invention to provide a new class of epoxy bisphenols. It is a further object of the invention to provide a new class of epoxy bisphenol intermediates from which improved epoxy ethers, useful in the preparation of superior solid infusible products, may be synthesized. Another object of the invention is the provision of a process for the preparation of such epoxy bisphenols. Other objects will be apparent from the following detailed description of the invention.

These objects are accomplished in the invention by a novel epoxy-substituted polynuclear polyhydric phenol comprising an epoxyalkyl chain wherein one carbon atom is connected to each of two hydroxyphenyl substituents. These novel bisphenols are prepared by reacting an epoxyalkyl carbonylic compound selected from the group consisting of aldehydes and ketones with a hydroxyaryl compound, such as a phenol. Alternatively, the bisphenols may be obtained by condensing the hydroxyaryl compound with a chlorohydrin-substituted carbonylic compound in the presence of alkaline material such as caustic.

It has been found that the novel epoxy bisphenols prepared in this manner possess, particularly because of the presence of the epoxyalkyl group located in a central position in relation to the phenolic groups, many unexpected and superior properties as compared to conventional bisphenols. It has been found, for example, that from these bisphenols can be prepared special polyepoxy ethers which upon curing with conventional epoxy curing agents yield products having excellent hardness at elevated temperatures. Such cured products are also characterized by improved resistance to water and solvents, rendering the new ethers useful as high temperature adhesives, laminates, molded articles and improved surface coatings.

The novel epoxy bisphenols of the invention can be best understood from the following detailed description of their preparation. They are obtained by condensing a phenol with an epoxy-substituted carbonylic compound or a substituted carbonylic compound, such as a chlorohydrin-substituted carbonylic compound, that can be converted to the epoxy-substituted derivative. This condensation is effected by mixing the phenol and the carbonylic compound together using a substantial excess of the phenol over the stoichiometric proportions of phenol required for reaction with the carbonylic compound, introducing hydrogen chloride, allowing the mixture to react for several days, and removing the unreacted phenol by such a method as distillation.

The phenols used in the condensation reaction may be monohydric or polyhydric and may be substituted with other substituents as halogen atoms, alkoxy radicals, hydrocarbyl radicals and the like. Examples of the monohydric phenols that may be used in the above process include, among others, phenol, 3-chlorophenol, 3,5-dichlorophenol, 3-ethylphenol, 3,5-diisopropylphenol, 3-methoxyphenol, 3-chloro-5-methoxyphenol, ortho- and meta-cresol, and the like. Particularly preferred are the monohydric phenols containing from 6 to 12 carbon atoms and containing elements of the group consisting of carbon, hydrogen, oxygen and chlorine.

Examples of polyhydric phenols that may be used in the preparation of the above-described polyhydric phenols include, among others, resorcinol, 2,2-bis(4-hydroxyphenyl)propane, 2,2-bis(4-hydroxyphenyl)butane, 1,4-dihydroxy-3-butylbenzene, 1,4-dihydroxy-3-tertiary-butylbenzene, catechol, hydroquinone, methyl resorcinol, 1,5-dihydroxynaphthalene, 4,4'-dihydroxybenzophenone, bis-(4-hydroxyphenyl)ethane and the like, and their chlorinated derivatives. Preferred polyhydric phenols to be employed are the di- and trihydric phenols substituted on single aromatic ring or rings that are joined together through an alkylene group and containing no more than 25 carbon atoms and preferably no more than 15 carbon atoms. It will be seen that the hydroxyphenyl compounds described are mononuclear and binuclear monohydric and polyhydric phenols wherein at least one of the ring carbon atoms is attached to a replaceable hydrogen atom.

The epoxy-substituted carbonylic compound used in the condensation reaction to form the new polyhydric phenols are those aliphatic or cycloaliphatic compounds having at least one 1,2-epoxy group, i.e., a

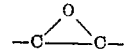

group, and at least one carbonylic group, i.e., a

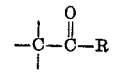

group, wherein R is hydrogen or a hydrocarbon radical, and preferably an alkyl or cycloalkyl radical containing up to 10 carbon atoms. Examples of these compounds include, among others, glycidaldehyde, 2,3-epoxybutyraldehyde, 1,2-epoxy-3-ketobutane, 2,3-epoxy-4-ketobutane and the like. Particularly preferred are the monoepoxy and diepoxy-substituted aliphatic monoaldehydes and monoketones containing from 3 to 12 carbon atoms, and particularly those wherein the epoxy group and carbonyl group are in close proximity to one another and most preferably in adjacent positions. Another particularly preferred class of bisphenol product is that produced by the reaction of epoxyalkyl aldehydes wherein the hydroxyphenyl substituents are connected to the terminal carbon atom of the epoxyalkyl chain.

The derivatives of the above-noted epoxy-substituted carbonylic compounds that may be used in their place in preparing the new polyhydric phenols are those that on further treatment give the epoxy-substituted compounds, such as their chlorohydrin derivatives. In this case, the epoxy group in the above compounds is replaced by the

group which can be converted to the epoxy group by treatment with alkaline materials. Representative of these compounds are alpha-hydroxy-beta-chloropropionaldehyde and alpha-hydroxy-beta-chlorobutyraldehyde. When these compounds are reacted with the phenols described, the products are alpha-hydroxy-beta-chloro-bisphenyl-alkanes, which when treated with caustic to dehydrohalogenate the chlorohydrin group form the novel epoxyalkyl bisphenols of the invention. Alternatively, a phenol may be reacted with a carbonylic chlorohydrin in the presence of an alkaline material, e.g., NaOH, KOH and the like, in such a way that condensation and dehydrohalogenation occur concurrently to yield the product epoxyalkyl bisphenol.

The phenolic and carbonylic reactants are most conveniently mixed together, preferably with a substantial excess of the phenol over the stoichiometric quantity required, and heated until a homogeneous liquid mixture is obtained. A catalytic amount of hydrogen chloride gas is then introduced into the solution, and the solution is allowed to stand until reaction is complete. The excess phenol and catalyst may then be readily removed by such conventional methods as distillation, leaving behind the higher molecular weight bisphenol.

In the preferred embodiment, when glycidaldehyde and phenol are reacted together under these conditions, the product has the formula

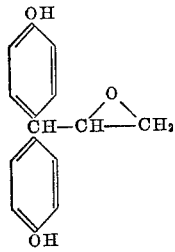

It will be seen, however, that by selection of appropriate carbonylic and phenolic reactants bisphenols having the general structure

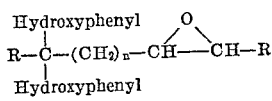

are obtained, wherein R is, as noted above, hydrogen or a hydrocarbyl radical, and is preferably an alkyl or cycloalkyl radical containing up to ten carbon atoms, and $n$ is a number from 0 to 9.

From the epoxy bisphenols of this type, the polyepoxy ethers are obtained by methods described in our copending application Serial No. 749,608, filed July 21, 1958, now U.S. Patent 3,014,892, of which this application is a continuation-in-part.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

EXAMPLE I

*1,2-Epoxy-3,3-Bis(Hydroxyphenyl)Propane*

Three and six one-hundredths moles of glycidaldehyde as a 61.2% aqueous solution and 3.6 moles of phenol were introduced into a stirred glass kettle and warmed until a homogeneous solution was obtained. The contents were cooled to 30° C. Hydrogen chloride gas was introduced into the solution and the solution allowed to stand several days. The solution was then heated between 40° and 60° C. for several hours. Excess phenol was then removed by distillation at 130° C. at 8 mm. The resulting bisphenol was a soft light-colored solid soluble in hot water.

The preparation of one of the new polyhydric phenols using a chlorohydrin derivative of the epoxy-substituted carbonylic compound is illustrated by the following preparation of chlorohydroxy-3,3-bis(hydroxyphenyl)propane from 1-hydroxy-2-chloropropanal.

EXAMPLE II

*Chlorohydroxy-3,3-Bis(Hydroxyphenyl)Propane*

Three and six one-hundredths moles of 1-hydroxy-2-chloropropanal as an aqueous solution and 3.6 moles of phenol were introduced into a stirred glass kettle and warmed until a homogeneous solution was obtained. Contents were cooled to 30° C. Hydrogen chloride gas was introduced into the solution and the solution allowed to stand several days. The solution was then heated to 60–70° C. for several hours. Excess phenol was then removed by distillation at 123° C. at 5 mm. The resulting product, identified as chlorohydroxy-3,3-bis(hydroxyphenyl)propane, was received in 96% yield and had the following analysis: OH value, 1.04 eq./100 g.; Cl, 10.6% phenolic acidity .861 eq./100 g.; C, 66.3%; H, 5.5%.

EXAMPLE III

By using the following reactants, the following epoxy bisphenols are obtained in excellent yield:

| Phenolic Reactant | Carbonylic Reactant | Bisphenol |
|---|---|---|
| Phenol | 1,2-Epoxy-3-ketobutane | 1,2-Epoxy-3,3-bis(hydroxyphenyl)butane. |
| Do | 1,2-Epoxy-3-ketohexane | 1,2-Epoxy-3,3-bis(hydroxyphenyl)hexane. |
| Do | 1,2-Epoxy-4-ketopentane | 1,2-Epoxy-4,4-bis(hydroxyphenyl)pentane. |
| Resorcinol | Glycidaldehyde | 1,2-Epoxy-3,3-bis(dihydroxyphenyl)propane. |
| o-Cresol | do | 1,2-Epoxy-3,3-bi((o-cresyl)propane. |
| Resorcinol | 1,2-Epoxy-3-ketobutane | 1,2-Epoxy-3,3-bis(dihydroxyphenyl)butane. |

EXAMPLE IV

This example illustrates the preparation and some of the properties of a polyglycidyl ether of 1,2-epoxy-3,3-bis(4-hydroxyphenyl)propane.

1,2-epoxy-3,3-bis(hydroxyphenyl)propane is dissolved in 7:1 molar excess of epichlorohydrin and about 2.3% by weight of water is added. This solution is heated vigorously with stirring and the kettle temperature is adjusted to 100° C. at total reflux by adding additional water. After the kettle temperature has been adjusted, 2% molar excess of sodium hydroxide is added as a 46% by weight equivalent solution. A caustic solution is added over a 1.5 hour period. During this period the kettle temperature is maintained at 100° C. by removing water periodically. The system is azeotroped to dryness after all the caustic solution has been added. The solution is filtered to remove salt formed during the reaction and the filtrate is distilled to remove the excess epichlorohydrin. This distillation is taken to a kettle temperature of 150° C. to 170° C. at 1–2 mm. to insure complete removal of epichlorohydrin and other valuable products. The resulting product is a white soft wax-like solid having an epoxy value of 0.541 eq./100 g., hydroxy value of .168 eq./100 g., and chlorine value of 0.59%.

One hundred parts of the above-described glycidyl ether was mixed with 15 parts of meta-phenylenediamine and the mixture heated at 125° C. for several hours. The resulting product had a heat distortion point of 158° C. The Barcol hardness ratings of the casting after being maintained at various temperatures are shown in the table below:

| Temperature, ° C | RT | 60 | 80 | 100 | 120 | 140 | 150 |
|---|---|---|---|---|---|---|---|
| Barcol Hard | 55 | 48 | 46 | 42 | 37 | 33 | 29 |

The Barcol hardness values of a similar casting prepared from the glycidyl ether of 2,2-bis(4-hydroxyphenyl)propane are shown below:

| Temperature, ° C | RT | 60 | 80 | 100 | 120 | 140 | 150 |
|---|---|---|---|---|---|---|---|
| Barcol Hard | 40 | 25 | 23 | 14 | 6 | 0 | 0 |

After boiling in acetone for 3 hours, the casting had a Barcol hardness of 50 with a gain in weight of .43%. After being in boiling water for 3 hours, the casting had a Barcol hardness of 47 and had lost 1.0% in weight.

The novel epoxy bisphenols are useful for a variety of purposes. In addition to their utility as intermediates in the preparation of polyepoxy ethers, as described above, they may be employed for preparing resinous materials of other types or for modifying such resinous materials. By reacting the bisphenols with polycarboxylic acids, such as maleic or adipic acids, hard resinous polyester compositions are obtained. The epoxy group of the bisphenol is also reactive under suitable conditions. For example, upon acid hydrolysis the ring may be opened to yield useful polyhydroxyalkyl bisphenols of the type described in U.S. Patent 2,798,079, issued July 2, 1957, to Linn. Reaction of the epoxy group with such mineral acids as hydrochloric acid also produces ring opening to yield such derivatives as bis(hydroxyphenyl) alpha-hydroxy-beta-chloropropane, whose biological activity renders them useful in the preparation of fungicides, insecticides and pharmaceuticals.

We claim as our invention:

1. The mono-vic-epoxy-substituted polynuclear polyhydric phenol consisting of a vic-epoxyalkyl chain of from 3 to 12 carbon atoms, one of said chain carbon atoms being connected to each of two hydroxyphenyl substituents, two other chain carbon atoms being included in the vic-epoxy ring, and each hydroxyphenyl group having up to 3 hydroxyl groups and selected from the group consisting of mononuclear and binuclear phenols having up to 25 carbon atoms, wherein at least one ring carbon atom is attached to a replaceable hydrogen atom.

2. The mono-vic-epoxy-substituted polynuclear polyhydric phenol consisting of a vic-epoxyalkyl chain of from 3 to 12 carbon atoms, wherein one terminal carbon atom of the chain is connected to each of two hydroxyphenyl substituents, each hydroxyphenyl substituent having up to 3 hydroxyl groups and selected from the group consisting of mononuclear and binuclear phenols having up to 25 carbon atoms, wherein at least one ring carbon atom is attached to a replaceable hydrogen atom, and two other chain carbon atoms being included in the vic-epoxy ring.

3. The mono-vic-epoxyalkyl bisphenol of the structure

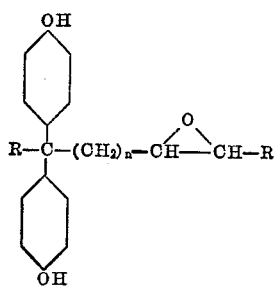

where R is selected from the group consisting of hydrogen and alkyl of up to 10 carbon atoms, and $n$ is an integer from 0 to 9.

4. 1,2-epoxy-3,3-bis(hydroxyphenyl)propane.

5. 1,2-epoxy-3,3-bis(hydroxyphenyl)pentane.

6. The process for preparing a mono-vic-epoxy-substituted polynuclear polyhydric phenol comprising reacting a vic-epoxyalkyl monocarbonylic compound selected from the group consisting of vic-epoxyalkyl monoaldehydes and vic-epoxyalkyl ketones of from 3 to 12 carbon atoms, in liquid phase with a substantial excess of a hydroxyphenyl compound having up to 3 hydroxyl groups and selected from the group consisting of mononuclear and binuclear phenols having up to 25 carbon atoms, wherein at least one ring carbon atom is attached to a replaceable hydrogen atom, in the presence of a catalytic amount of hydrogen chloride, and recovering the excess hydroxyphenyl compound.

7. The process of claim 6, wherein the monocarbonylic compound is an alpha,beta-vic-epoxyalkyl aldehyde of from 3 to 12 carbon atoms.

8. The process of claim 6, wherein the hydroxyphenyl compound is phenol.

9. The process for preparing a mono-vic-epoxy-substituted polynuclear polyhydric phenol comprising reacting in liquid phase glycidaldehyde with a substantial excess of a hydroxyphenyl compound of up to 3 hydroxyl groups and selected from the group consisting of mononuclear and binuclear phenols having up to 25 carbon atoms, wherein at least one ring carbon atom is attached to a replaceable hydrogen atom, in the presence of a catalytic amount of hydrogen chloride, and recovering the excess hydroxyphenyl compound.

10. The process of claim 9, wherein the hydroxyphenyl compound is phenol.

11. The process for preparing a mono-vic-epoxy-substituted polynuclear polyhydric phenol comprising reacting in liquid phase a hydroxyphenyl compound having up to 3 hydroxyl groups and selected from the group consisting of mononuclear and binuclear phenols having up to 25 carbon atoms, wherein at least one ring carbon atom is attached to a replaceable hydrogen atom with an alpha-hydroxy-beta-chloroalkyl aldehyde of from 3 to 12 carbon atoms, in the presence of an alkaline material.

12. The process of claim 11 wherein the aldehyde is alpha-hydroxy-beta-chloropropionaldehyde.

13. The process of claim 11 wherein the hydroxyphenyl compound is phenol.

References Cited in the file of this patent

UNITED STATES PATENTS

| | | |
|---|---|---|
| 2,506,486 | Bender et al. | May 2, 1950 |
| 2,858,342 | Bender et al. | Oct. 28, 1958 |
| 2,935,452 | La France et al. | May 3, 1960 |

OTHER REFERENCES

Levy et al.: Chem. Abs. vol. 19, pages 3485–6 (1925).

Richter: Textbook of Organic Chemistry, page 90, J. Wiley, 1952.